Patented Jan. 3, 1939

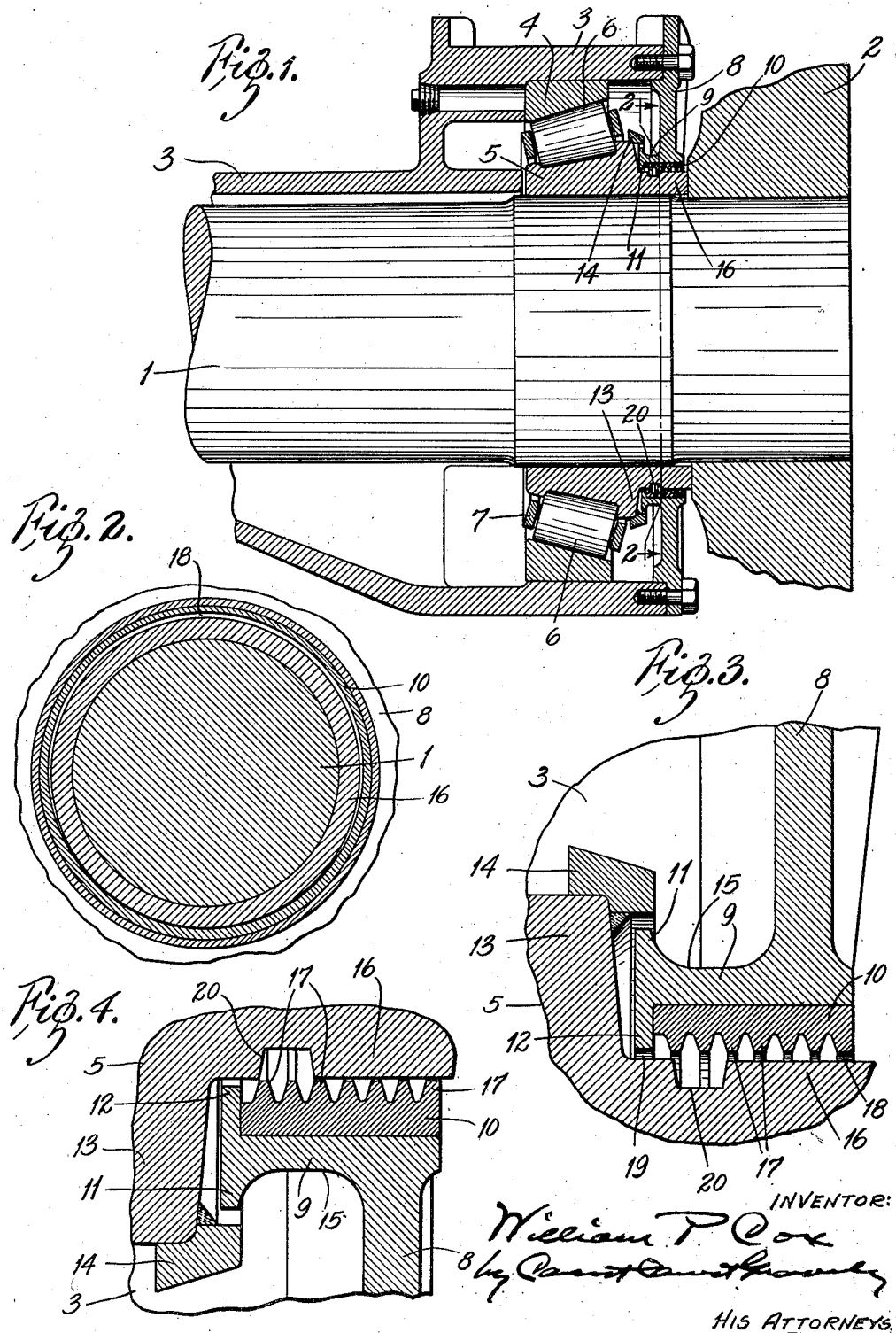

2,142,632

UNITED STATES PATENT OFFICE 2,142,632

END CLOSURE FOR AXLE HOUSINGS

William P. Cox, Canton, Ohio, assignor to The Timken Roller Bearing Company, Canton, Ohio, a corporation of Ohio Application March 18, 1938, Serial No. 196,611

7 Claims. (Cl. 308—187.1)

My invention relates to axle constructions of the type wherein the axle projects beyond the end of a housing and a roller bearing is interposed between the axle and the housing. The principal object of the invention is to devise means which will prevent the escape of lubricant and will remain operative even when the axle shifts somewhat from its correct position in relation to the housing. The invention consists in the parts and combinations of parts hereinafter described and claimed.

In the accompanying drawing which forms part of this specification and wherein like numerals refer to like parts wherever they occur, Fig. 1 is a longitudinal sectional view of a portion of an axle construction embodying my invention;

Fig. 2 is a cross-section thereof on the line 2—2 of Fig. 1; and

Figs. 3 and 4 are enlarged longitudinal sections of the sealing ring and portions of the inner raceway member and closure plate adjacent thereto, Fig. 3 showing the top portion and Fig. 4 showing the bottom portion respectively.

The axle construction shown in Fig. 1 is of the locomotive driving axle type. It comprises an axle 1 having a driving wheel 2 secured on its end, a hollow housing 3 and a taper roller bearing interposed between the axle and the housing. This bearing comprises a cup or outer raceway member 4 seated in the enlarged end of the housing, a cone or inner raceway member 5 secured on the axle, a series of taper rollers 6 interposed between the two raceway members and a cage 7 for spacing said rollers apart. The outer end of the cone bears against the hub of the wheel.

Secured to the end of the housing is a closure plate 8 with an opening enough larger than the outer end portion of the inner raceway member 5 to accommodate the sealing ring 10 hereinafter described. The wall of this hole is elongated longitudinally of the axle after the manner of a hub 9 and at its inner end is widened by one flange 11 which extends radially outwardly and by a second flange 12 which extends radially inwardly.

Mounted on the thrust rib portion 13 of the inner bearing member and overlapping the end flange of the hub of the closure plate is a ring 14 whose outer surface preferably tapers toward the body of the closure plate. By this arrangement, there is a tendency for centrifugal force to fling the oil on the tapered ring back into the bearing; but any oil dripping from said ring will fall into the groove 15 on the outer surface of the hub and flow to the bottom of the housing.

According to the present invention, a wide sealing ring 10 is mounted in the bore in the hub of the closure plate and around an integral annular extension 16 of the inner raceway member. This sealing ring has a series of annular ribs 17 in its inside wall with grooves between them. The sealing ring is made with its inner and outer peripheral surfaces eccentric with relation to each other and is mounted with its outer surface concentric with the bore of the hub of the closure plate and with the axle when the axle is in its correct position. The sealing ring is initially mounted with its ribs in contact or almost in contact with the bottom surface of the cone extension and with a substantial clearance 18 between the top of the cone extension and said annular ribs. That is, the inside diameter of the ribs of the sealing ring is larger than the diameter of the extension of the inner raceway member or axle member and the ring is substantially tangential to the bottom of the extension whereby the ring has considerable clearance at the top of said extension and very little clearance or no clearance at all at the bottom thereof; but this top clearance is less than the clearance 19 between the flange 12 of the closure plate and said extension of the inner raceway member. The sealing ring may be made of bronze or other soft metal or it may be made of synthetic rubber or the like. Opposite the inner end portion of the sealing ring, the extension of the inner raceway member has a circumferential groove 20.

When the parts are correctly adjusted, with the axle concentric with the bore in the hub of the closure plate, any oil which may reach the extension of the inner raceway member is likely to creep into the circumferential groove 20 of said extension and pass out into the oil well or sump at the bottom of the housing. As the oil would be more likely to creep longitudinally of said extension at the bottom thereof than at the top, it is more important to have the sealing ring contact with the bottom of said extension than with the top thereof and this is the condition which prevails when the parts are in correct position.

When, due to looseness of the bearings or other cause, the housing drops down, the sealing ring drops with the housing; but, in doing so, the bottom of the sealing ring merely moves transversely away from the extension of the inner raceway member and the top of the sealing ring moves toward that extension; but, even so, the sealing ring continues to function with some degree of efficiency. Until such time as the total clearance at the top portion of the sealing ring is taken up, no part of the housing load is transmitted through said sealing ring; and, when the sealing ring is made of elastic material, such as synthetic rubber, it will yield progressively, as the housing continues to drop and thus will take away from the bearing a greater and greater portion of the load which is normally carried by the bearing.

While I have described the inner raceway member as having an integral extension which intervenes between the sealing ring and the axle, it is obvious that such extension may be omitted, in which case the groove 19 may be formed in the axle or in a separate sleeve thereon and the sealing ring will cooperate directly with said axle or the member thereon.

Reference is hereby made to my copending applications Serials Nos. 198,203 and 198,204 filed March 26, 1938, which cover matter partially disclosed but not claimed herein.

What I claim is:

1. The combination with a housing having an opening in its end, an axle extending through said opening, and a sealing ring in said opening, the inside surface of said sealing ring being farther from the top of the axle than from the bottom thereof.

2. The combination with a housing having an opening in its end, an axle extending through said opening, and a sealing ring in said opening, the inside surface of said sealing ring having annular grooves therein and being farther from the top of the axle than from the bottom thereof.

3. The combination with a housing having an opening in its end, an axle member extending through said opening and having an annular groove inside of said opening, and a sealing ring in said opening, the inside surface of said sealing ring having annular grooves therein being farther from the top of the axle than from the bottom thereof.

4. The combination with a housing having an opening in its end, an axle member extending through said opening, and a sealing ring in said opening, the inside diameter of said ring being greater than the diameter of the axle member and the internal and external peripheries of said ring being eccentric and the inner surface of the ring being substantially tangent to the bottom of the axle member.

5. The combination of a housing having a closure plate at its end, an axle extending through said closure plate, a roller bearing between said axle and said housing, said bearing having an inner raceway member with an extension which extends through said closure plate, and a sealing ring between said extension and said closure plate, the lower portion of said ring being substantially in contact with said extension and the upper portion of the ring having considerable clearance from the extension when the axle is in correct position.

6. The combination of a housing having a closure plate at its end, an axle extending through said closure plate, a roller bearing between said axle and said housing, said bearing having an inner raceway member with an extension which extends through said closure plate, and a sealing ring between said extension and said closure plate, the inner and outer peripheries of said ring being eccentric, the lower portion of said ring being substantially in contact with said extension and the upper portion of the ring having considerable clearance from the extension when the axle is in correct position.

7. The combination of a housing having a closure plate at its end, an axle extending through said closure plate, a roller bearing between said axle and said housing, said bearing having an inner raceway member with an extension which extends through said closure plate and has an annular groove, and a sealing ring between said extension and said closure plate, said sealing ring having annular grooves in its inside surface and the inner end portion of said sealing ring being opposite the groove in said extension, the inner and outer peripheries of said ring being eccentric, the lower portion of said ring being substantially in contact with said extension and the upper portion of the ring having considerable clearance from the extension when the axle is in correct position.

WILLIAM P. COX.